US008078172B2

(12) United States Patent
Aaron (10) Patent No.: US 8,078,172 B2
(45) Date of Patent: Dec. 13, 2011

(54) METHODS, SYSTEMS, AND COMPUTER-READABLE MEDIA FOR RESERVING A CELLULAR RESOURCE

(75) Inventor: Jeffrey A. Aaron, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 844 days.

(21) Appl. No.: 11/863,890

(22) Filed: Sep. 28, 2007

(65) Prior Publication Data

US 2009/0088156 A1 Apr. 2, 2009

(51) Int. Cl.
*H04W 4/00* (2009.01)
*H04W 36/00* (2009.01)
(52) U.S. Cl. .................... 455/436; 455/442; 455/438
(58) Field of Classification Search .................. 455/436, 455/438, 442, 428, 439, 67.11, 450, 440; 370/331, 338, 390
See application file for complete search history.

(56) References Cited

U.S. PATENT DOCUMENTS

| 5,189,734 | A | * | 2/1993 | Bailey et al. | 455/438 |
| 5,574,968 | A | * | 11/1996 | Olds et al. | 455/428 |
| 7,305,238 | B2 | * | 12/2007 | Gabara | 455/442 |
| 2006/0281461 | A1 | * | 12/2006 | Kwun et al. | 455/436 |

* cited by examiner

*Primary Examiner* — Kiet Doan
(74) *Attorney, Agent, or Firm* — Hope Baidauff Hartman LLC (57) ABSTRACT

Methods, systems, and computer-readable media provide for reserving a cellular resource. According to embodiments, a method for reserving a cellular resource is provided. According to the method, a change in location is determined for a preferred cellular device. Whether the preferred cellular device will be handed off from a first cell to a second cell is predicted based on the change in location for the preferred mobile cellular device. In response to predicting that the preferred cellular device will be handed off from the first cell to the second cell, a cellular resource in the second cell is reserved for the preferred cellular device.

15 Claims, 4 Drawing Sheets

METHODS, SYSTEMS, AND COMPUTER-READABLE MEDIA FOR RESERVING A CELLULAR RESOURCE

TECHNICAL FIELD

This application relates generally to the field of quality of service. More specifically, the disclosure provided herein relates to the field of cellular-related quality of service.

BACKGROUND

Cellular-related quality of service ("QoS") issues are a significant source of frustration for service providers as well as their customers. Common QoS issues include bandwidth limitations, jitter, delay and latency, packet loss, and interference. QoS issues may result in a number of problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. QoS problems may result in unacceptable quality of service, causing customer dissatisfaction ranging from annoyance to anger.

A cellular network generally includes a plurality of cells, each of which is associated with a cellular tower. Each cellular tower may provide service for a number of cellular devices within a range of the associated cell. The quality of service provided by the cellular tower may be limited by its available bandwidth and other cellular resources. As such, the cellular network may limit the number of devices connected to the network. A conventional method for limiting access to the cellular network is connection admission control ("CAC"). Generally, CAC admits and denies a new connection based on available bandwidth and other network resources of the cellular tower. However, the determination whether to admit or deny a new connection is typically made for only one cellular device at a time without regard to other cellular devices.

SUMMARY

Embodiments of the disclosure presented herein include methods, systems, and computer-readable media for reserving a cellular resource. According to one aspect, a method for reserving a cellular resource is provided. According to the method, a change in location is determined for a preferred cellular device. Whether the preferred cellular device will be handed off from a first cell to a second cell is predicted based on the change in location for the preferred mobile cellular device. In response to predicting that the preferred cellular device will be handed off from the first cell to the second cell, a cellular resource in the second cell is reserved for the preferred cellular device.

According to another aspect, a system for reserving a cellular resource is provided. The system includes a memory and a processor functionally coupled to the memory. The memory stores a program containing code for reserving the cellular resource. The processor is responsive to computer-executable instructions contained in the program and operative to determine a change in location for a preferred cellular device, predict whether the preferred cellular device will be handed off from a first cell to a second cell based on the change in location for the preferred mobile cellular device, and in response to predicting that the preferred cellular device will be handed off from the first cell to the second cell, reserve a cellular resource in the second cell for the preferred cellular device.

According to yet another aspect, a computer-readable medium having instructions stored thereon for execution by a processor to perform a method for reserving a cellular resource is provided. According to the method, a change in location is determined for a preferred cellular device. Whether the preferred cellular device will be handed off from a first cell to a second cell is predicted based on the change in location for the preferred mobile cellular device. In response to predicting that the preferred cellular device will be handed off from the first cell to the second cell, a cellular resource in the second cell is reserved for the preferred cellular device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for predicting user movement to improve quality of service ("QoS"). In the following detailed description, references are made to the accompanying drawings that form a part hereof, and which are shown by way of illustration specific embodiments or examples.

Different users commonly have different service demands. For example, some users prefer utilizing their cellular devices (e.g., a cellular phone, smartphone, personal digital assistant ("PDA")) for applications and content that is not resource intensive, such as voice and text messaging. Other users may prefer utilizing their cellular device for applications and content that is more resource intensive, such as streaming music and video. In many cases, the users who demand more resource intensive content pay a premium to service providers for access to such content. Further, QoS related issues for QoS-sensitive applications and/or resource intensive content are generally more noticeable and problematic. For example, QoS related factors such as bandwidth problems may cause both a streaming video to be choppy and a text message to be delayed in transmission. While the delay in the transmission of a text message may be a minor nuisance, the recipient of the text message will still eventually receive the text message. On the other hand, a choppy streaming video may render the video entirely unwatchable. Examples of other QoS-related factors include, but are not limited to, jitter, delay, latency, data loss, and interference.

A cellular tower or sector, with associated base stations, generally provides limited resources, such as bandwidth, to users admitted into an associated cell. If the cellular tower admits too many cellular devices into the cell or if the applications performed by the cellular devices are too resource intensive, the overall QoS provided by the cellular tower to all users, and in particular, the resource intensive users, in the cell may suffer. One way to address resource limitations of the cellular tower may be to limit a total number of users admitted into the cell and/or to limit the types of users admitted into the cell.

Embodiments described herein provide a prediction mechanism for improving QoS. In particular, the prediction mechanism may predict the movement of a preferred cellular device across one or more cells, and in response to predicting that the preferred cellular device will move into a given cell, reserve a cellular resource, such as bandwidth, in the given cell in anticipation of the preferred cellular device moving into the given cell and the resource demands of the preferred cellular device. The prediction mechanism may include rules, instructions, thresholds, pattern recognition, and other predictive methods that benefit the QoS of the preferred cellular device even at expense of degrading QoS of other cellular devices. The preferred cellular device may include those cellular devices associated with resource intensive users and/or premium service plans (e.g., high bandwidth service plans).

As described in greater detail below, the prediction mechanism may predict that the preferred cellular device will move into the given cell. In response to predicting that the preferred cellular device will move into the given cell, the prediction mechanism may directly or indirectly reserve the cellular resource, such as bandwidth, in the given cell by denying requests for admission into the given cell from new cellular devices, selectively dropping existing cellular devices from the given cell, and/or performing other actions for the benefit of reserving the cellular resource in the given cell for the preferred cellular device. As a result, the prediction mechanism may proactively reserve the cellular resource for the preferred cellular device prior to the preferred cellular device even entering and requesting admission into the given cell. By proactively reserving the cellular resource for the preferred cellular device, a sufficient level of the cellular resource will be available for the preferred cellular device when the preferred cellular device is admitted into the given cell.

For the sake of simplicity, the embodiments described herein primarily refer to and address bandwidth limitations of the cells, in accordance with one embodiment. It should be appreciated, however, that the embodiments described herein may address limitations of any suitable cellular resource associated with the cells. In addition to bandwidth, further examples of cellular resources include, but are not limited to, logical resources and/or associations (i.e., radio access bearers), logical assignments and/or descriptors (e.g., identifiers, labels), time slots, frequencies, priorities, codes, and the like.

Figure 1A:
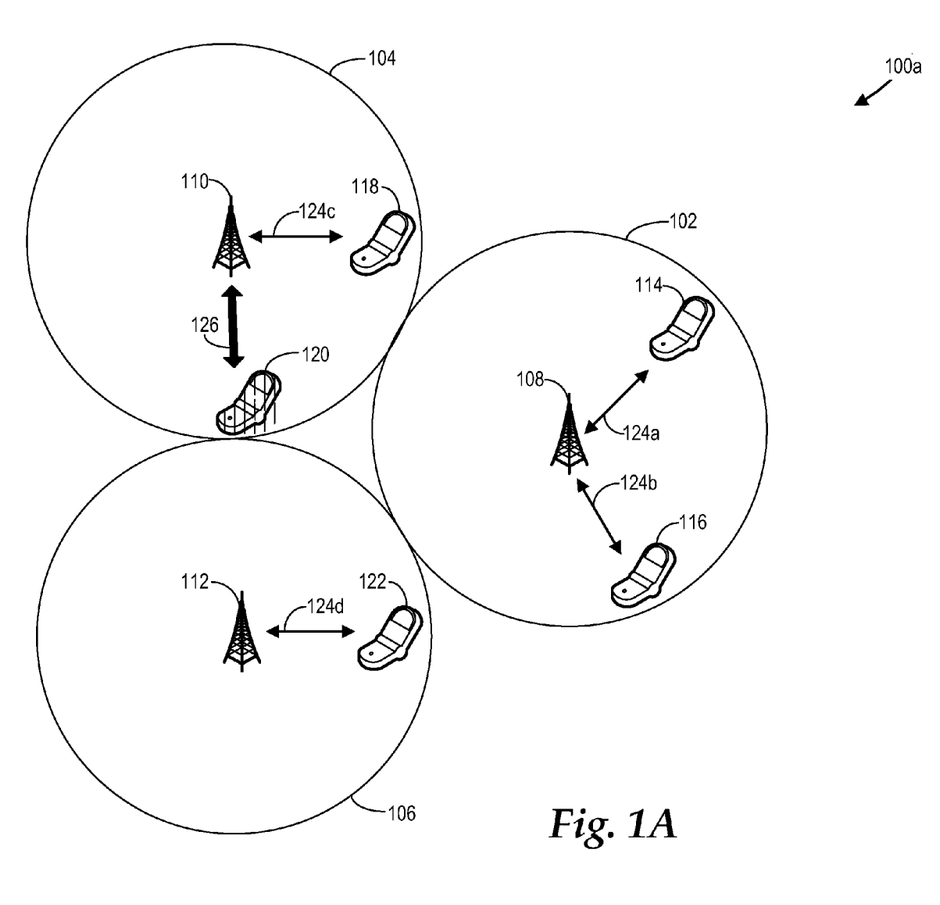
FIG. 1A is a high-level diagram illustrating an exemplary configuration of a first cell, a second cell, a third cell, and a plurality of cellular devices.

Referring now to the drawings, it is to be understood that like numerals represent like elements through the several figures, and that not all components and/or steps described and illustrated with reference to the figures are required for all embodiments. FIG. 1A is a high-level diagram illustrating an exemplary configuration 100a of cells 102, 104, 106 and cellular devices 114, 116, 118, 120, 122. The configuration 100a includes the first cell 102, the second cell 104, and the third cell 106. Each of the cells 102, 104 106 is associated with a cellular tower 108, 110, 112, which provides service for the cells 102, 104, 106. In particular, the first cell 102 is associated with the first cellular tower 108. The second cell 104 is associated with the second cellular tower 110, and the third cell 106 is associated with the third cellular tower 112. The first cellular device 114 and the second cellular device 116 are admitted into the first cell 102. That is, the first cellular device 114 and the second cellular device 116 can transmit and receive communications via the first cellular tower 108. The third cellular device 118 and the fourth cellular device 120 are admitted into the second cell 104. That is, the third cellular device 118 and the fourth cellular device 120 can transmit and receive communications via the second cellular tower 110. The fifth cellular device 122 is admitted into the third cell 106. That is, the fifth cellular device 122 can transmit and receive communications via the third cellular tower 112. While the cells 102, 104, 106 are shown in an adjacent arrangement in FIG. 1A, it should be appreciated that the cells 102, 104, 106 may also be entirely separate or at least partially overlapping.

As illustrated in FIG. 1A, the first cellular device 114, the second cellular device 116, the third cellular device 118, and the fifth cellular device 122 are designated as low QoS devices. As used herein, a low QoS device refers to a device that is associated with a less bandwidth intensive service plan, a less bandwidth intensive current, and/or a less bandwidth projected usage. For example, the less bandwidth intensive service plan and/or usage may include low bandwidth applications such as voice and text, but exclude or limit the high bandwidth applications such as streaming music and video. The lower bandwidth allowed by the first cellular tower 108 to the first cellular device 114 is indicated by a first thin link 124a between the first cellular tower 108 and the first cellular device 114. The lower bandwidth allowed by the first cellular tower 108 to the second cellular device 116 is indicated by a second thin link 124b between the first cellular tower 108 and the second cellular device 116. The lower bandwidth allowed by the second cellular tower 110 to the third cellular device 118 is indicated by a third thin link 124c between the second cellular tower 110 and the third cellular device 118. The lower bandwidth allowed by the third cellular tower 112 to the fifth cellular device 122 is indicated by a fourth thin link 124d between the third cellular tower 112 and the fifth cellular device 122.

Further, as illustrated in FIG. 1A, the fourth cellular device 120 is designated as a high QoS device. As used herein, the high QoS device refers to a device that is associated with a more bandwidth intensive service plan or a more bandwidth intensive current and/or projected usage. For example, the more bandwidth intensive service plan and/or usage may provide a greater amount of bandwidth than the less bandwidth intensive service plan for executing high bandwidth applications such as streaming music and video. The higher bandwidth allowed by the second cellular tower 110 to the fourth cellular device 120 is indicated by a thick link 126 between the second cellular tower 110 and the fourth cellular device 120. The thin links 124a, 124b, 124c, 124d and the thick link 126 are illustrated in FIG. 1A as solid lines, which indicate that the cellular devices 114, 116, 118, 120, 122 have been admitted into the corresponding cells 102, 104, 106.

Figure 1B:
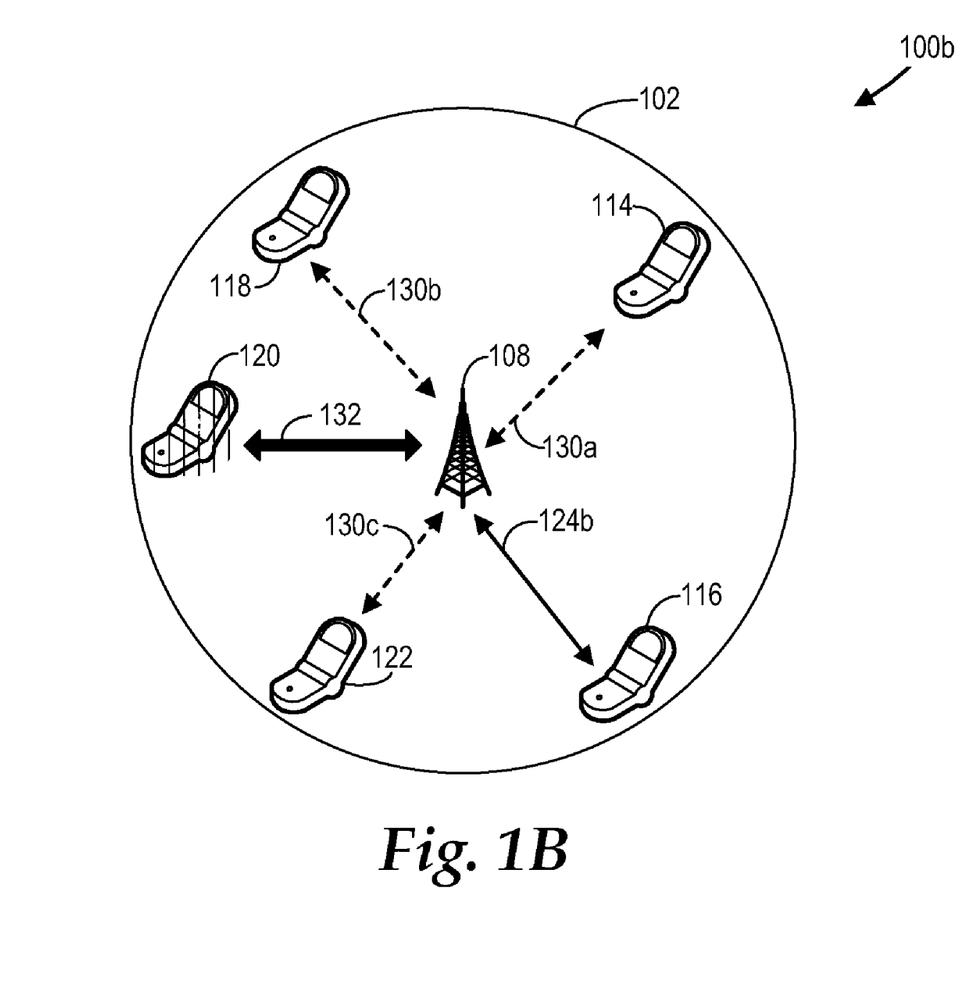
FIG. 1B is a high-level diagram illustrating an exemplary configuration of the first cell and the cellular devices after movement by the cellular devices into the first cell.

FIG. 1B is a high-level diagram illustrating an exemplary configuration 100b of the first cell 102 and the cellular devices 114, 116, 118, 120, 122 after movement by the cellular devices 118, 120, 122 into the first cell 102. In one embodiment, a prediction mechanism, such as a prediction module 216 of FIG. 2, may predict the movement of one or more of the cellular devices 114, 116, 118, 120, 122 from one of the cells 102, 104, 106 to another. For example, the prediction module 216 of FIG. 2 may predict that the fourth cellular device 120 will move from the second cell 104 to the first cell 102 and request admission into the first cell 102 to enable communication with the first cellular tower 108. The prediction performed by the prediction module 216 is described in greater detail below with respect to FIG. 3. Because the fourth cellular device 120 is designated as a high QoS device, the prediction module 216 may further ensure that the first cellular tower 108 provides sufficient bandwidth to the fourth cellular device 120 to execute high bandwidth applications, such as streaming music and video, even at the expense of other devices, such as the devices 114, 116, 118, 122, designated as low QoS devices.

In one embodiment, the prediction module 216 ensures that the first cellular tower 108 provides sufficient bandwidth by selectively dropping existing cellular devices, such as the cellular device 114, from the first cell 102. In FIG. 1A, as indicated by the solid line of the first thin link 124*a* between the first cellular device 114 and the first cellular tower 108, the first cellular device 114 is admitted into the first cell 102. In FIG. 1B, the prediction module 216 has dropped the first cellular device 114 from the first cell 102. A first broken link 130*a* indicates that the first cellular device 114 can no longer transmit or receive communications via the first cellular tower 108 as a result of the prediction module 216 dropping the first cellular device 114. As such, while the first cellular device 114 is located in the first cell 102, the first cellular device 114 is no longer admitted into the first cell 102. In FIG. 1B, as indicated by the solid line of the second thin link 124*b* between the second cellular device 116 and the first cellular tower 108, the second cellular device 116 remains admitted to the first cell 102. The determination of whether to drop the existing cellular devices 114, 116 is described in greater detail below with respect to FIG. 3.

In a further embodiment, the prediction module 216 ensures that the first cellular tower 108 provides sufficient bandwidth by denying admission to new cellular devices, such as the cellular devices 118, 122, from the first cell 102. In FIG. 1A, as indicated by the solid line of the third thin link 124*c* between the third cellular device 118 and second cellular tower 110, the third cellular device 118 is admitted into the second cell 104. Further, as indicated by the solid line of the fourth thin link 124*d* between the fifth cellular device 122 and the third cellular tower 112, the fifth cellular device 122 is admitted into the third cell 106. In FIG. 1B, the third cellular device 118 and the fifth cellular device 122 have moved from the second cell 104 and the third cell 106, respectively, into the first cell 102. The third cellular device 118 and the fifth cellular device 122 have also requested admission into the first cell 102. The prediction module 216 has denied the request for admission from the third cellular device 118 and the fifth cellular device 122. A second broken link 130*b* indicates that the third cellular device 118 cannot transmit and receive communications via the first cellular tower 108 as a result of the prediction module 216 rejecting the request for admission from the third cellular device 118. A third broken link 130*c* indicates that the fifth cellular device 122 cannot transmit or receive communications via the first cellular tower 108 as a result of the prediction module 216 denying the request for admission from the fifth cellular device 122. As such, while the third cellular device 118 and the fifth cellular device 122 are located in the first cell 102, the third cellular device 118 and the fifth cellular device 122 are not admitted into the first cell 102. The determination of whether to deny a request for admission from the new cellular devices 118, 122 is described in greater detail below with respect to FIG. 3.

By dropping the first cellular device 114 and rejecting the request for admission from the third cellular device 118 and the fifth cellular device 122, the prediction module 216 proactively reserves an amount of bandwidth in anticipation of the fourth cellular device 120 entering the first cell 102 and requesting admission into the first cell 102. As illustrated in FIG. 1B, if the fourth cellular device 120 enters the first cell 102 and requests admission into the first cell 102, the prediction module 216 will accept the request for admission from the fourth cellular device 120. A thick link 132 indicates that the fourth cellular device 120, which is designated as a high QoS device, can transmit and receive communications via the first cellular tower 108 as a result of the prediction module 216 accepting the request for admission from the fourth cellular device 120. The reserved bandwidth may enable the fourth cellular device 120 to execute high bandwidth applications, such as streaming music and video.

Figure 2:
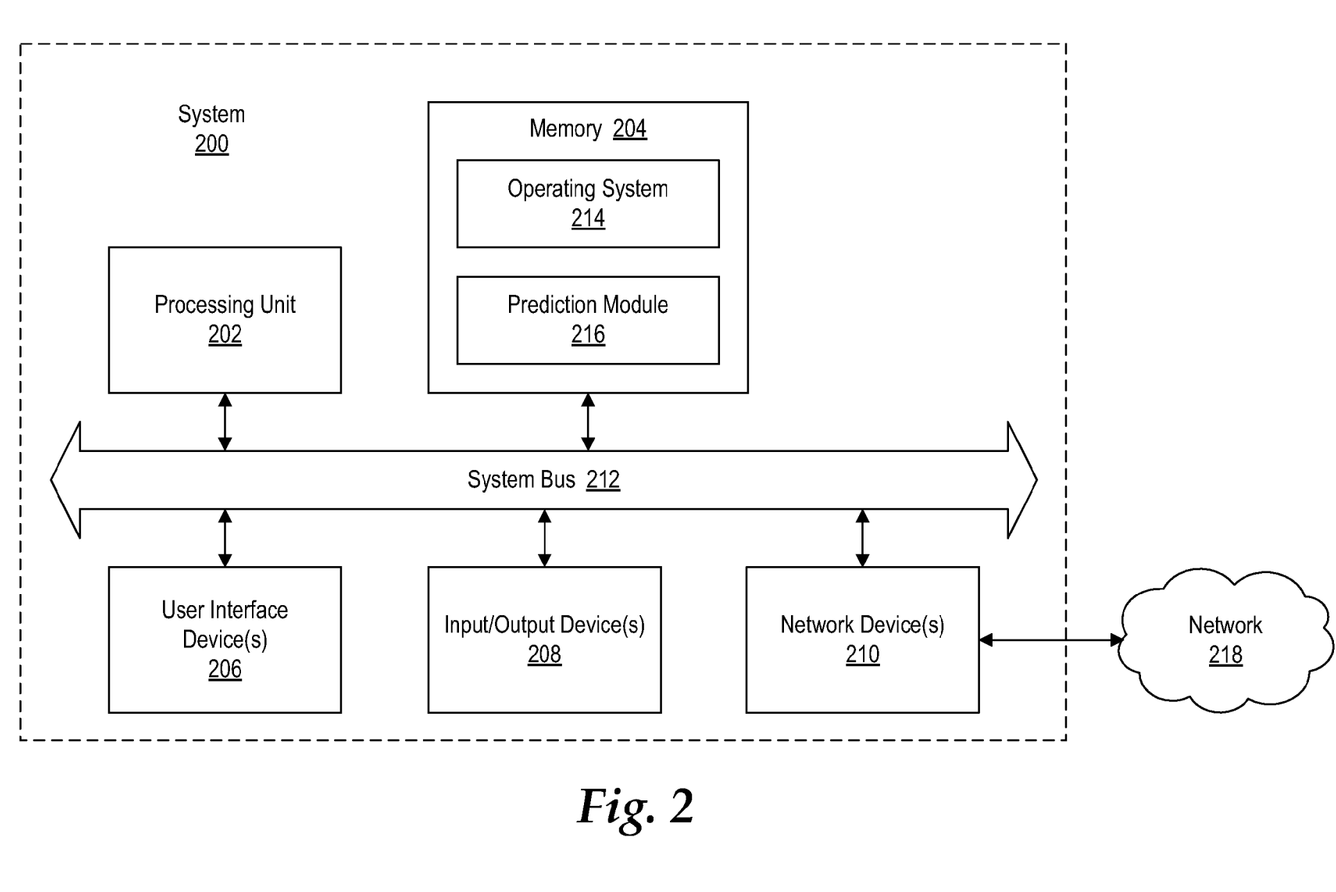
FIG. 2 is a block diagram illustrating the system configured to reserve a cellular resource, in accordance with exemplary embodiments.

FIG. 2 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 2 is a block diagram illustrating the system 200 configured to reserve a cellular resource, in accordance with exemplary embodiments. The system 200 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210. Examples of the system 200 include, but are not limited to, computers, servers, personal digital assistants, cellular phones, or any suitable computing devices.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. The memory 204 includes an operating system 214 and the prediction module 216, according to exemplary embodiments. Examples of operating systems, such as the operating system 214, include, but are not limited to, WINDOWS and WINDOWS CE/MOBILE operating system from MICROSOFT CORPORATION, MAC OS operating system from APPLE CORPORATION, LINUX operating system, SYMBIAN from SYMBIAN LIMITED, BREW from QUALCOMM CORPORATION, and FREEBSD operating system. In one embodiment, the prediction module 216 is embodied in computer-readable media containing instructions that, when executed by the processing unit 202, performs a method for reserving a cellular resource, as described in greater detail below with respect to FIG. 3. According to further embodiments, the prediction module 216 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 200.

The user interface devices 206 may include one or more devices with which a user accesses the system 200. The user interface devices 206 may include, but are not limited to, computers, servers, personal digital assistants, cellular phones, or any suitable computing devices. The I/O devices 208 enable a user to interface with the prediction module 216. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, or an electronic stylus. Further, the I/O devices 208 may include one or more output devices, such as, but not limited to, a display screen or a printer.

The network devices 210 enable the system 200 to communicate with other networks or remote systems via a network, such as the network 218. Examples of network devices 210 may include, but are not limited to, a modem, a radio frequency ("RF") or infrared ("IR") transceiver, a telephonic interface, a bridge, a router, or a network card. The network 218 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 218 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

In one embodiment, the system 200 is operatively coupled to each of the cellular towers 108, 110, 112 via the network 218 to predict the movement of the cellular devices 114, 116, 118, 120, 122 and to reserve the bandwidth in the respective cells 102, 104, 106. In another embodiment, the system 200 is operatively coupled to two or more of the cellular towers 108, 110, 112 via the network 218. In this case, the system 200 may serve as a central controller for two or more of the cellular towers 108, 110, 112. In yet another embodiment, the system 200 is included in one or more of the cellular devices 114, 116, 118, 120, 122. In this case, the cellular devices 114, 116, 118, 120, 122 may operate in conjunction to predict the movement of the cellular devices 114, 116, 118, 120, 122 and to reserve the bandwidth in the respective cells 102, 104, 106 without utilizing a central controller.

It should be noted that in the case where the system 200 is operatively coupled to the cellular towers 108, 110, 112 via the network 218, the system 200 may be configured to deny requests from the cellular devices 114, 116, 118, 120, 122 to enter one of the cells 102, 104, 106. In contrast, if the system 200 is included in the cellular devices 114, 116, 118, 120, 122, the system 200 may be configured to prevent the cellular devices 114, 116, 118, 120, 122 from entering or requesting to enter one of the cells 102, 104, 106.

Figure 3:
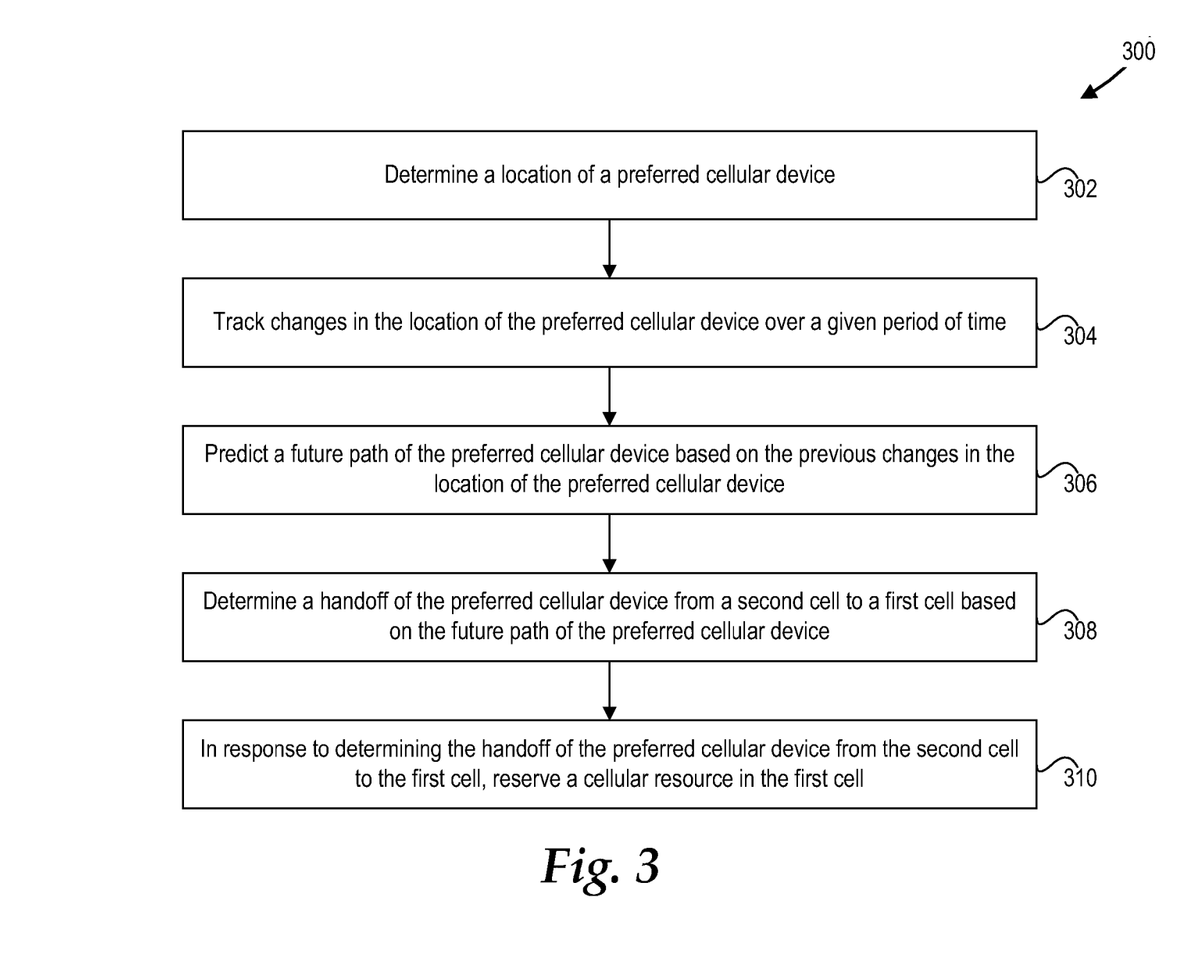
FIG. 3 is a flow diagram illustrating a method for reserving a cellular resource, in accordance with exemplary embodiments.

FIG. 3 is a flow diagram illustrating a method 300 for reserving a cellular resource, in accordance with exemplary embodiments. According to the method 300, the prediction module 216 determines (at 302) a location of a preferred cellular device. In the example illustrated in FIGS. 1A and 1B, the preferred cellular device is the fourth cellular device 120. The location of the fourth cellular device 120 may be determined by any suitable device or system, such as a global positioning system ("GPS") or geographic information system ("GIS") device, or method, such as triangulation. The location of the fourth cellular device 120 may also be determined based on location information provided by the fourth cellular device 120. For example, the prediction module 216 may poll the fourth cellular device 120 for the location information, or the fourth cellular device 120 may voluntarily provide the location information to the prediction module 216 at given intervals.

The prediction module 216 tracks (at 304) changes, if any, in the location of the fourth cellular device 120 over a given period of time. In one embodiment, the prediction module 216 tracks the changes in the location of the fourth cellular device 120 by recording any movement of the fourth cellular device 120. The movement may include any suitable movement factors, such as the direction of the movement, the speed of the movement, the timing of the movement, and type of movement. The type of movement may indicate a level of uncertainty with regards to a pattern of movement. For example, direct and uninterrupted movements are generally more certain and predictable, whereas interrupted and wandering movements are generally less certain and unpredictable. The location of the fourth cellular device 120 may be tracked over any period of time sufficient to predict a future path of the fourth cellular device 120.

The prediction module 216 predicts (at 306) a future path of the fourth cellular device 120 based on the previous changes in the location of the fourth cellular device 120. In one embodiment, the prediction module 216 predicts the future path of the fourth cellular device 120 by extrapolating the historical and/or continuing movement of the fourth cellular device 120 into a future period of time. For example, one or more of the direction of movement, the speed of movement, the timing of movement, the type of movement, and other movement factors may be used to determine a pattern of movement, which may be indicative of future path of the fourth cellular device 120. In one embodiment, the future path includes a range of possible paths. In one embodiment, the possible paths may be determined utilizing any suitable devices or systems, such as a global positioning system ("GPS") device and a geographic information system ("GIS") device. The GIS device may provide, for example, geographic and/or map-related information, such as streets and highways. As such, the GIS device may enable the prediction module 216 to eliminate paths that may be impossible or highly unlikely due to geographic or map-related limitations. The possible paths may be each associated with a likelihood that the fourth cellular device 120 will follow the possible path. The likelihood that the fourth cellular device 120 will follow the possible path may be based on an error associated with each of the possible paths. The prediction module 216 may further determine (at 308) a handoff that is likely to occur from one of the cells, such as the second cell 104, to another one of the cells, such as the first cell 102, based on the future path of the fourth cellular device 120. The likelihood that the fourth cellular device 120 will follow each of the possible paths may affect the likelihood that a particular handoff will occur.

In response to predicting that the fourth cellular device 120 will hand off (i.e., be handed off) from the second cell 104 to the first cell 102, the prediction module 216 reserves (at 310) bandwidth in the first cell 102 for the fourth cellular device 120 prior to the handoff. In one embodiment, the prediction module 216 reserves bandwidth by denying or introducing bias into the first cellular tower 108 to deny requests for admission into the first cell 102. For example, in FIG. 1B, the prediction module 216 may deny the requests for admission into the first cell 102 from the third cellular device 118 and the fifth cellular device 122. The prediction module 216 may send a mollifying message to the third cellular device 118 and the fifth cellular device 122. The mollifying message may include information explaining the necessity of denying admission. Further, in some cases, the mollifying message may also offer service discounts, refunds, or other benefits to mitigate any user annoyance that may be engendered as a result of denying admission to the users of the third cellular device 118 and the fifth cellular device 122. In a further embodiment, the prediction module 216 reserves bandwidth by selectively dropping cellular devices or introducing bias into the first cellular tower 108 to force the cellular devices to drop from the first cell 102. In one example, in FIG. 1B, the prediction module 216 may drop the first cellular device 114. In another example, in FIG. 1B, the prediction module 216 may introduce a bias into the first cellular tower 108 in which communications with the first cellular device 114 become so degraded that the first cellular device 114 is forced to drop from the first cell 102. In yet another example, in FIG. 1B, the prediction module 216 may introduce a bias into the first cellular tower 108 that increases the likelihood that the first cellular device 114 will be dropped from the first cell 102. The prediction module 216 may send a mollifying message to the first cellular device 114 offering a rebate, for example, in response to the first cellular device 114 ceasing transmission. The number and type of cellular devices that are denied admission, the degree of bias introduced, the number of cellular devices that are dropped, and the overall amount of bandwidth to reserve may be based on any suitable factors associated with fourth cellular device 120, such as the likelihood that the fourth cellular device 120 will be handed off from the second cell 104 to the first cell 102.

In one embodiment, instead of entirely denying requests for admission from the third cellular device 118 and the fifth cellular device 122, the prediction module 216 may partially admit the cellular devices 118, 122 into the first cell 102. For example, the prediction module 216 may allow the cellular devices 118, 122 to execute a limited set of applications or usages, such as low bandwidth applications, in the first cell 102. However, the prediction module 216 may prevent the cellular devices 118, 122 from executing high bandwidth applications or usages in the first cell 102.

Due to the nature of dropping cellular devices, such as the first cellular device 114, and denying requests for admission from cellular devices, such as the cellular devices 118, 122, a number of problems may arise. In one example, unforeseen interactions may occur between high QoS users if the high QoS users are further divided into multiple categories. For example, the high QoS users may be divided into a first category and a second category where the first category provides a higher QoS than the second category. In this case, the first category of high QoS users may cause the second category of high QoS users to be dropped because the second category of high QoS users are low QoS relative to the first category of high QoS users. In another example, when a substantially large number of low QoS users are dropped, customer satisfaction may suffer. To alleviate the aforementioned problems and others, it may be desirable in practice to limit the operation of handing off certain users while dropping others. Examples include, but are not limited to, limiting the number of drops over a given time period (e.g., one hour), limiting the number of drops to a given threshold, and limiting the number of drops for a given user or group of users.

It should be noted that in practice, users and/or devices may be divided or classified into multiple categories along a range of QoS rather than simply two categories, high QoS and low QoS, as described herein. As used herein, hand off and handed off refer to the communications link between a cellular device and a cellular tower or sector being transitioned to a different communications link between the cellular device and a different tower or sector.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for reserving a cellular resource, comprising:
   determining a change in location for a preferred cellular device;
   extrapolating the change in location for the preferred cellular device into a future time period to determine a first estimated movement path to second cell and a second estimated movement path to a third cell for the preferred cellular device, the first estimated path and the second estimated movement path comprising different potential paths of the preferred cellular device;
   determining a first error value indicating whether the first estimated movement path is highly unlikely due to geographic limitations associated with the first estimated movement path;
   determining a first likelihood value that the preferred cellular device traverses the second cell based on the first error value of the first estimated movement path;

determining a second error value indicating whether the second estimated movement path is highly unlikely due to geographic limitations associated with the second estimated movement path;

determining a second likelihood value that the preferred cellular device traverses the third cell based on the second error value of the second estimated movement path;

comparing the first likelihood value and the second likelihood value;

upon comparing the first likelihood value and the second likelihood value, predicting that the preferred cellular device will be handed off from the first cell to the second cell if the first likelihood that the preferred cellular device traverses the second cell is greater than the second likelihood that the preferred cellular device traverses the third cell;

upon comparing the first likelihood value and the second likelihood value, predicting that the preferred cellular device will be handed off from the first cell to the third cell if the second likelihood that the preferred cellular device traverses the third cell is greater than the first likelihood that the preferred cellular device traverses the second cell; and in response to predicting that the preferred cellular device will be handed off from the first cell to the second cell, reserving an amount of a cellular resource in the second cell for the preferred cellular device, whereby reserving the amount of the cellular resource for the preferred cellular device makes the amount of the cellular resource available for the preferred cellular device and unavailable for other cellular devices.

2. The method of claim 1, wherein determining a change in location for the preferred cellular device comprises:

determining the location of the preferred cellular device at regular intervals over a given period of time; and determining the change in location for the preferred cellular device based on the location of the preferred cellular device at regular intervals over the given period of time.

3. The method of claim 1, wherein reserving an amount of a cellular resource in the second cell for the preferred cellular device comprises reserving an amount of bandwidth in the second cell for the preferred cellular device.

4. The method of claim 1, wherein reserving an amount of a cellular resource in the second cell for the preferred cellular device comprises dropping a communications connection of an existing cellular device from the second cell prior to the hand off.

5. The method of claim 1, wherein reserving a cellular resource in the second cell for the preferred cellular device comprises denying a request for admission into the second cell from a new cellular device.

6. A system for reserving a cellular resource, comprising:

a memory for storing a program containing code for reserving the cellular device;

a processor functionally coupled to the memory, the processor being responsive to computer-executable instructions contained in the program and operative to at least:

determine a change in location for a preferred cellular device, extrapolate the change in location for the preferred cellular device into a future time period to determine a first estimated movement path to second cell and a second estimated movement path to a third cell for the preferred cellular device, the first estimated path and the second estimated movement path comprising different potential paths of the preferred cellular device, determine a first error value indicating whether the first estimated movement path is highly unlikely due to geographic limitations associated with the first estimated movement path, determine a first likelihood value that the preferred cellular device traverses the second cell based on the first error value of the first estimated movement path, determine a second error value indicating whether the second estimated movement path is highly unlikely due to geographic limitations associated with the second estimated movement path, determine a second likelihood value that the preferred cellular device traverses the third cell based on the second error value of the second estimated movement path, compare the first likelihood value and the second likelihood value, upon comparing the first likelihood value and the second likelihood value, predict that the preferred cellular device will be handed off from the first cell to the second cell if the first likelihood that the preferred cellular device traverses the second cell is greater than the second likelihood that the preferred cellular device traverses the third cell, upon comparing the first likelihood value and the second likelihood value, predict that the preferred cellular device will be handed off from the first cell to the third cell if the second likelihood that the preferred cellular device traverses the third cell is greater than the first likelihood that the preferred cellular device traverses the second cell, and in response to predicting that the preferred cellular device will be handed off from the first cell to the second cell, reserve an amount of a cellular resource in the second cell for the preferred cellular device, whereby reserving the amount of the cellular resource for the preferred cellular device makes the amount of the cellular resource available for the preferred cellular device and unavailable for other cellular devices.

7. The system of claim 6, wherein to determine a change in location for the preferred cellular device, the processor is further operative to at least:

determine the location of the preferred cellular device at regular intervals over a given period of time, and determine the change in location for the preferred cellular device based on the location of the preferred cellular device at regular intervals over the given period of time.

8. The system of claim 6, wherein the cellular resource in the second cell comprises an amount of bandwidth in the second cell.

9. The system of claim 6, wherein to reserve an amount of a cellular resource in the second cell for the preferred cellular device, the processor is further operative to at least drop the communications connection of an existing cellular device from the second cell prior to the hand off.

10. The system of claim 6, wherein to reserve an amount of a cellular resource in the second cell for the preferred cellular device, the processor is further operative to at least deny a request for admission into the second cell from a new cellular device.

11. A non-transitory computer-readable medium having instructions stored thereon for execution by a processor to provide a method for reserving a cellular resource, the method comprising:

determining a change in location for a preferred cellular device;

extrapolating the change in location for the preferred cellular device into a future time period to determine a first estimated movement path to second cell and a second estimated movement path to a third cell for the preferred cellular device, the first estimated path and the second estimated movement path comprising different potential paths of the preferred cellular device;

determining a first error value indicating whether the first estimated movement path is highly unlikely due to geographic limitations associated with the first estimated movement path;

determining a first likelihood value that the preferred cellular device traverses the second cell based on the first error value of the first estimated movement path;

determining a second error value indicating whether the second estimated movement path is highly unlikely due to geographic limitations associated with the second estimated movement path;

determining a second likelihood value that the preferred cellular device traverses the third cell based on the second error value of the second estimated movement path;

predicting that the preferred cellular device will be handed off from the first cell to the second cell if the first likelihood that the preferred cellular device traverses the second cell is greater than the second likelihood that the preferred cellular device traverses the third cell;

predicting that the preferred cellular device will be handed off from the first cell to the third cell if the second likelihood that the preferred cellular device traverses the third cell is greater than the first likelihood that the preferred cellular device traverses the second cell; and in response to predicting that the preferred cellular device will be handed off from the first cell to the second cell, reserving an amount of a cellular resource in the second cell for the preferred cellular device, whereby reserving the amount of the cellular resource for the preferred cellular device makes the amount of the cellular resource available for the preferred cellular device and unavailable for other cellular devices.

12. The non-transitory computer-readable medium of claim 11, wherein determining a change in location for the preferred cellular device comprises:

determining the location of the preferred cellular device at regular intervals over a given period of time; and determining the change in location for the preferred cellular device based on the location of the preferred cellular device at regular intervals over the given period of time.

13. The non-transitory computer-readable medium of claim 11, wherein reserving a cellular resource in the second cell for the preferred cellular device comprises reserving an amount of bandwidth in the second cell for the preferred cellular device.

14. The non-transitory computer-readable medium of claim 11, wherein reserving an amount of a cellular resource in the second cell for the preferred cellular device comprises dropping a communications connection of an existing cellular device from the second cell prior to the hand off.

15. The non-transitory computer-readable medium of claim 11, wherein reserving an amount of a cellular resource in the second cell for the preferred cellular device comprises denying a request for admission into the second cell from a new cellular device.

* * * * *